United States Patent Office 3,287,429
Patented Nov. 22, 1966

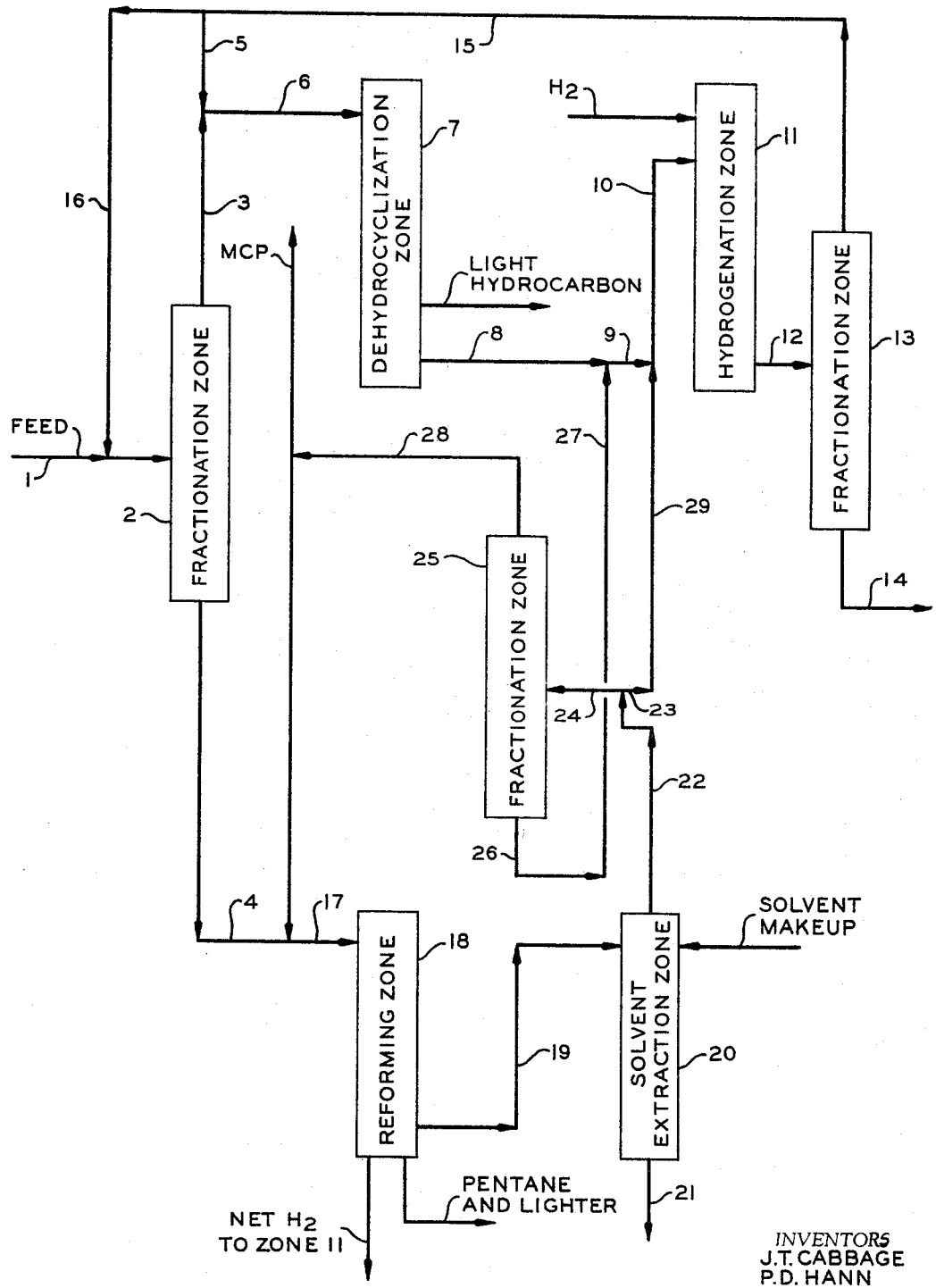

3,287,429
HYDROCARBON PRODUCTION
John T. Cabbage and Paul D. Hann, Bartlesville, Okla., assignors to Phillips Petroleum Company, a corporation of Delaware
Filed Sept. 8, 1964, Ser. No. 394,772
4 Claims. (Cl. 260—666)

This invention relates to a method and apparatus for producing high purity cycloparaffins.

Heretofore in conventional cyclohexane production systems fractionation steps have been utilized to remove straight and branched chain hydrocarbons such as isohexane and normal hexane since such hydrocarbons are useful in the blending of gasolines and are not readily converted to cyclohexane or to materials such as benzene, which themselves could be converted to cyclohexane. Also, in such systems, paraffinic impurities such as 2,2- and 2,4-dimethylpentanes were removed by fractionation. However, since the dimethylpentanes boil quite closely to cyclohexane and methylcyclopentane, which are valuable materials since cyclohexane is the desired end product and methylcyclopentane can be reformed to benzene and then hydrogenated to cyclohexane, a certain and not insignificant amount of cyclohexane and methylcyclopentane was lost with the removal of the dimethylpentanes. Thus, these conventional systems are to some degree inefficient in that all the materials present in the initial feed which can be used to make cyclohexane are not retained and so utilized.

It has now been found that by a precise combination and interrelation of dehydrocyclization, reforming, solvent extraction, and hydrogenation operations, a significant amount of straight and branched chain paraffins can be converted to benzene and ultimately to cyclohexane and little or no cyclohexane or methylcyclopentane is lost when the dimethylpentane impurities are removed from the feed. Thus, a very efficient cyclohexane producing system is evolved which system obtains maximum amounts of cyclohexane product per unit of feed material.

Accordingly, it is an object of this invention to provide a more economical method and apparatus for producing a high purity cycloparaffin. It is another object of this invention to provide a method and apparatus for increasing the production of a high purity cycloparaffin per unit of feed material.

Other aspects, objects and the several advantages of this invention are apparent from a study of this disclosure, the drawings and the appended claims.

According to this invention there is provided a method and apparatus whereby high purity cyclohexane is produced by fractionating a full range hexanes hydrocarbon feed of which the essential constituents are isohexane, normal hexane, methylcyclopentane and dimethylpentanes. A commercial feed can contain from a trace to 20 percent isohexanes, a trace to 60 percent normal hexanes, a trace to 30 percent methylcyclopentane, a trace to 40 percent cyclohexane, a trace to 20 percent dimethylpentanes and up to 40 percent benzene, all percentages by volume, and the balance being other petroleum hydrocarbons. The fractionated feed produces a light fraction of which the essential constituents are isohexanes and normal hexanes. A commercial light fraction can contain a trace to 30 percent isohexanes, a trace to 90 percent normal hexanes, and up to 10 percent methylcyclopentane, all percentages by volume. The fractionated feed also produces a heavy fraction of which the essential constituents are methylcyclopentane, cyclohexane and dimethylpentanes. A commercial heavy fraction can contain a trace to 70 percent methylcyclopentane, a trace to 15 percent dimethylpentane, up to 40 percent benzene and up to 40 percent cyclohexane, all percentages by volume.

The light fraction is dehydrocyclized to convert isohexanes such as methylpentanes and dimethylbutanes and normal hexane into benzene and to produce a first benzene-rich material. The first benzene-rich material contains benzene as the essential ingredient in as large an amount as is possible to attain. A commercial material can contain a trace to 30 percent isohexane, a trace to 65 percent normal hexane and up to 70 percent benzene, all percentages by volume. The heavier fraction is reformed to convert cyclohexane and methylcyclopentane into benzene and to thereby form a second benzene-rich material which contains benzene as the essential ingredient in as large an amount as is possible to attain and lesser amounts of dimethylpentanes. A commercial second benzene-rich material or reformate can contain up to 40 percent methylcyclopentane, 2–10 percent dimethylpentanes, a trace to 70 percent benzene and up to 20 percent cyclohexane, all percentages by volume. The reformate is then solvent extracted to remove isomeric heptanes which boil in the same temperature range as benzene and cyclohexane. The isomeric heptanes are 2,2- and 2,4-dimethylpentanes and are quite difficult to separate from the more desirable constituents of the reformate, i.e. cyclohexane and methylcyclopentane.

The extract from the solvent extraction contains benzene and cyclohexane as the essential ingredients in as large an amount as is possible to attain. A commercial extract can contain up to 10 percent methylcyclopentane, up to about 1.0 percent dimethylpentanes, a trace to 85 percent benzene and up to about 10 percent cyclohexane, all percentages by volume. The extract can then either be further treated to remove unconverted constituents such as methylcyclopentane or all or part of the stream can be directly mixed with the effluent from the dehydrocyclization zone for subsequent hydrogenation and consequent production of cyclohexane. The raffinate from the solvent extraction, usually a relatively small quantity as compared to the extract stream, contains as essential constituents dimethylpentanes in amounts substantially the same as the amount present in said reformate and can contain up to about 25 percent methylcyclopentane, a trace to about 45 percent dimethylpentanes, up to about 40 percent benzene and up to about 15 percent cyclohexane, all percentages by volume.

The feed to the hydrogenation zone contains the components in the extract stream and the components in the first benzene-rich material, above referred to. In the hydrogenation unit benzene is converted to cyclohexane. The hydrogenated material can be utilized in the state in which it is present as it passes out of the hydrogenation zone or, preferably, can be further treated to separate therefrom isohexanes and normal hexanes to yield an even higher purity product, 98+ weight percent cyclohexane.

The drawing illustrates, in diagrammatic representation, the production of high purity cyclohexanes according to this invention.

More specifically, the drawing shows processing for a full range hexanes-containing hydrocarbon stream which contains a major amount of isohexanes, normal hexane, methylcyclopentane, cyclohexane, 2,2-dimethylpentane and 2,4-dimethylpentane. The feed material passes through 1 to fractionator 2, wherein is separated a light overhead fraction and a heavy bottom fraction. The light fraction, composed primarily of isohexanes and normal hexane, passes by 3 and 6 to a dehydrocyclization zone 7, wherein benzene is produced in substantial amounts from the iso- and normal hexanes. The heavier fraction, composed primarily of cyclohydrocarbons such as methylcyclopentane, cyclohexane, and paraffins such as 2,2-dimethylpentane and 2,4-dimethylpentane, passes from fractionator 2 by 4 and 17 into reforming zone 18, wherein benzene in substantial amounts is formed from cyclohexane and methylcyclopentane. The reformate from reforming zone 18 passes by 19 into solvent extraction zone 20, wherein, by use of known solvents, benzene, cyclohexane and methylcyclopentane are removed from dimethylpentanes which are quite difficult to separate from methylcyclopentanes and cyclohexane by conventional fractionation methods. The extract from solvent extraction zone 20 (having had solvent removed therefrom by known conventional steps) passes all or in part by way of 22 and 24 to fractionator 25 from which methylcyclopentane can be at least in part recovered as product by way of 28 or recycled at least in part to reforming zone 18, or all or part of the extract can be, without further fractionation, mixed with the effluent of the dehydrocyclization zone. Also, the extract, treated and/or untreated, can be hydrogenated, per se, and the same can be done with the effluent of the dehydrocyclization zone. It is preferred to mix the extract with the effluent of the dehydrocyclization zone prior to hydrogenation. It is also preferable to further fractionate the extract to remove the above-mentioned unconverted materials such as methylcyclopentane prior to hydrogenation thereof.

Purified and desirable materials such as benzene and cyclohexane pass from zone 25 into 26 and 27 to be mixed in 9 with the product of the dehydrocyclization zone 7. That portion of the extract, if there by any, which passes into 23 is added by 29 to the effluent of the dehydrocyclization zone 7 in line 10. The combined product of the various before-mentioned selective separation and formation zones then passes into hydrogenation zone 11, wherein benzene is hydrogenated to cyclohexane. The hydrogenate passes by 12 into separation zone 13, wherein, by means of a suitable operation such as fractionation, unconverted and undesirable materials, such as isohexane, normal hexane and methylcyclopentane, are separated from the hydrogenate and are returned by 5, 15 and 16, either in part or in whole, to the feed to fractionation zone 2 and/or, preferably, to dehydrocyclization zone 7. Whether all or part of the recycle material in line 15 is passed to line 5 or line 16 is determined by one skilled in the art, depending upon the purity requirements of the ultimate product of the process. Also, the amount of extract that is passed into 24 or 23 is determined, at least in part, by the purity requirement of the ultimate product of the process and/or the purity as to undesirable materials such as methylcyclopentane, of the extract from solvent extraction zone 20. The ultimate product of the process in the form of a high purity cyclohexane is withdrawn from separation zone 13 by 14 for passage to storage or other treatment as desired, and/or as described above.

It should be noted that the material recycled from zone 25 through 28 to reforming feed line 17 enriches the feed passing to reforming zone 18, since a substantial amount of the material in line 28 is of such a character, e.g., methylcyclopentane, that it is amenable to being transformed in reforming zone 18 into benzene to thereby produce additional desirable material and increase the productivity and economics of the overall process. It should also be noted that there are various zones not shown in the drawing which would be desirable or even necessary in the actual operation of the process. For example, there would desirably be a hydrogen separation zone in line 12 and solvent separation zone or zones in line 22 of the form described above.

The following example will serve further to illustrate the invention.

SPECIFIC EXAMPLE

| Stream Number | (1) Feed | (3) De-n C₆ [1] Overhead | (4) D-n C₆ Bottoms | (5) Fractionator Overhead | (6) Total to Zone 7 | (8) Effluent from 7 | (26) DeMCP [2] Bottoms | (10) Total to Zone 11 |
|---|---|---|---|---|---|---|---|---|
| Component: | | | | | | | | |
| Isohexanes | 106 | 106 | | 71 | 177 | 71 | | 71 |
| Normal Hexane | 533 | 533 | | 355 | 888 | 355 | | 355 |
| Methylcyclopentane | 200 | 10 | 190 | | 10 | | 2 | 2 |
| 2,2-dimethylpentane | 11 | | 11 | | | | 1 | 1 |
| Benzene | 24 | | 24 | | | 609 | 240 | 849 |
| 2,4-dimethylpentane | 21 | | 21 | | | | 2 | 2 |
| Cyclohexane | 105 | | 105 | | | | 34 | 34 |
| Total | 1,000 | 649 | 351 | 426 | 1,075 | [3] 1,035 | 279 | 1,314 |

| Stream Number | (12) Effluent from 11 | (14) Fractionator Bottoms | (28) DeMCP Overhead | (17) Total to Zone 18 | (19) Effluent from 18 | (21) Raffinate | (22) Extract |
|---|---|---|---|---|---|---|---|
| Component: | | | | | | | |
| Isohexanes | 71 | | | | | | |
| Normal Hexane | 355 | | | | | | |
| Methylcyclopentane | 2 | 2 | 59 | 249 | 72 | 11 | 61 |
| 2,2-dimethylpentane | 1 | 1 | | 11 | 7 | 6 | 1 |
| Benzene | | | | 24 | 260 | 20 | 240 |
| 2,4-dimethylpentane | 2 | 2 | | 21 | 14 | 12 | 2 |
| Cyclohexane | 1,066 | 1,066 | | 105 | 40 | 6 | 34 |
| Total | 1,497 | [4] 1,071 | 59 | 410 | [3] 393 | 55 | 338 |

[1] De-n C₆ is De-normal Hexanizer.
[2] DeMCP is De-methylcyclopentanizer.
[3] Stabilized product.
[4] 99.4 mol percent purity.

Unit operations

Fractionator (2):
- Top temperature, °F. _____ 220
- Bottom temperature, °F. _____ 257
- Pressure, p.s.i.g. _____ 40

Fractionator (13):
- Top temperature, °F. _____ 237
- Bottom temperature, °F. _____ 285
- Pressure, p.s.i.g. _____ 40

Fractionator (25):
- Top temperature, °F. _____ 245
- Bottom temperature, °F. _____ 260
- Pressure, p.s.i.g. _____ 40

Reforming zone (18):
- Pressure, p.s.i.g. _____ 500
- Temperature, °F. _____ 900
- Space velocity, v./v./hr. _____ 2
- H$_2$/hydrocarbon mol ratio _____ 7:1
- Catalyst.—Platinum-type reforming catalyst, alumina impregnated with 0.4 weight percent platinum and 0.4 weight percent chlorine.

Dehydrocyclization zone (7):
- Pressure, p.s.i.g. _____ 10
- Temperature, °F. _____ 950
- Space velocity, v./v./hr. _____ 0.5
- Catalyst.—Platinum-type catalyst, activated alumina impregnated with 0.4 weight percent platinum and 0.35 weight percent fluorine.

(No hydrogen is used in this example. Hydrogen, of course, can be added, e.g. at a mol ratio of 5:1, or so, to minimize coking of the catalyst.)

Solvent extraction zone (20):
- Temperature, °F. _____ 225
- Pressure, p.s.i.g. _____ 150
- Hydrocarbon/solvent, volume ratio _____ 1:1
- Solvent: Triethylene glycol [a].

[a] Other solvents include glycol ethers such as polyethylene glycols, polypropylene glycols, carbitols, and Cellosolves.

Hydrogenation zone (11):
- Pressure, p.s.i.g. _____ 500
- Temperature, °F. _____ 500
- Hydrogen/benzene mol ratio _____ 9:1
- Catalyst.—Conventional nickel on kieselguhr.

The hydrogenation of the benzene-containing stream to form cyclohexane can be accomplished by any conventional and known hydrogenation process. For example, such materials as nickel, platinum and palladium, associated with supporting materials such as silica, alumina, kieselguhr and various synthetic clays can be employed as hydrogenation catalysts.

The solvent extraction of the reformate can be effected by any conventional and known method which utilizes a solvent that is selective to aromatic and naphthene materials while rejective of paraffinic materials. In the example such a solvent a triethylene glycol. It should be noted that a solvent which is merely aromatic-selective is not suitable for this invention since such solvents will not remove cyclohexane and methylcyclopentane from paraffinic materials present. Other conventional aromatic and naphthenic solvents known to those skilled in the art can be employed in the solvent extraction of the reformate.

The reforming of the heavy fraction can be achieved by known methods for converting methylcyclopentane and cyclohexane to benzene. Such methods include heating the heavy fraction to a temperature in the range of 875° to 975° F. and at a pressure in the range of 200 to 600 p.s.i.g. and in the presence of a platinum-containing reforming catalyst.

Other methods of reforming in accordance with this invention are known to those skilled in the art.

The dehydrocyclization operation can be any process capable of converting straight and branched chain hydrocarbons to an aromatic hydrocarbon. Examples of such catalysts include 0.2 to 1 weight percent platinum on activated alumina with 0.2 to 3 weight percent fluorine, chromium oxide, molybdenum oxide and cobalt molybdata. The catalyst can be activated by suitable materials such as neodynium oxide or oxide catalysts and are preferably deposited on supports such as alumina or activated alumina.

Reasonable variations and modifications of this invention can be made, or followed, in view of the foregoing, without departing from the spirit or scope thereof.

We claim:

1. A method for producing high purity cyclohexane comprising providing a first material containing iso and normal hexanes and a second material containing cyclohexane, benzene, methylcyclopentane and dimethylparaffins which are difficult to separate from cyclohexane, passing said first material to a dehydrocyclization zone and therein in the presence of a dehydrocyclization catalyst converting iso and normal hexanes to benzene to produce a first benzene-rich stream, passing said second material to a reforming zone and therein in the presence of a reforming catalyst converting cyclohexane and methylcyclopentane to benzene to produce a second benzene-rich stream containing said difficult-to-separate paraffins, passing said second benzene-rich stream to a solvent extraction zone and therein contacting said stream with a solvent which is selective to aromatics and naphthenes to remove said difficult-to-separate paraffins from said stream and to produce a benzene-rich extract, adding such benzene-rich extract to said first benzene-rich stream, contacting the composite stream produced by said adding of said benzene-rich extract to said first benzene-rich stream with hydrogen in the presence of a hydrogenation catalyst to convert benzene to cyclohexane, and recovering from the hydrogenation effluent a high purity cyclohexane.

2. A method according to claim 1 wherein prior to the adding of the benzene-rich extract to the first benzene-rich stream at least a part of said benzene-rich extract is separated and fractionated to remove at least a part of the methylcyclopentane contained therein and to produce a purified benzene-rich stream, and adding said purified benzene-rich stream along with said benzene-rich extract to said first benzene-rich stream for hydrogenation and subsequent recovery of high purity cyclohexane.

3. A method according to claim 1 wherein prior to adding said benzene-rich extract to said first benzene-rich stream said extract is fractionated to remove at least a part of said contained methylcyclopentane and to produce a purified benzene-rich stream, adding said purified benzene-rich stream to said first benzene-rich stream for subsequent hydrogenation and recovery of high purity cyclohexane.

4. A method for producing a high purity cyclohexane comprising fractionating a hydrocarbon feed comprising hexanes, methylcyclopentane, cyclohexane, and dimethylpentanes to produce a light hexanes-containing product and a heavy methylcyclopentane, dimethylpentane and cyclohexane containing product, dehydrocyclizing the light product to make a benzene-rich stream, reforming the heavier product to make a benzene-rich reformate, solvent extracting the reformate to remove therefrom said dimethylpentanes and produce a benzene-rich extract, hydrogenating said extract and said benzene-rich stream to produce a hydrogenate and recovering therefrom high purity cyclohexane.

References Cited by the Examiner

UNITED STATES PATENTS 3,150,195  9/1964  Findlay _____ 260—666
3,211,797  10/1965 Houston _____ 260—666

DELBERT E. GANTZ, *Primary Examiner.*

V. O'KEEFE, *Assistant Examiner.*